UNITED STATES PATENT OFFICE.

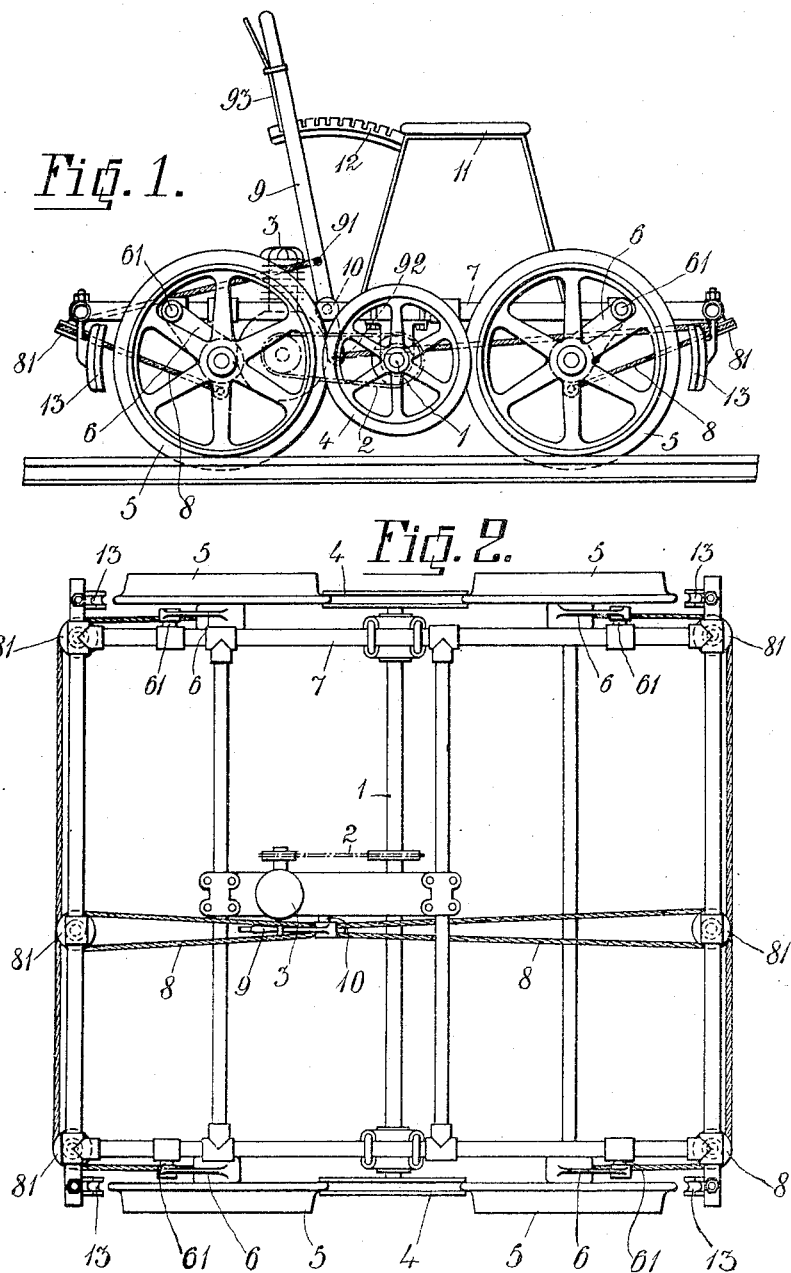

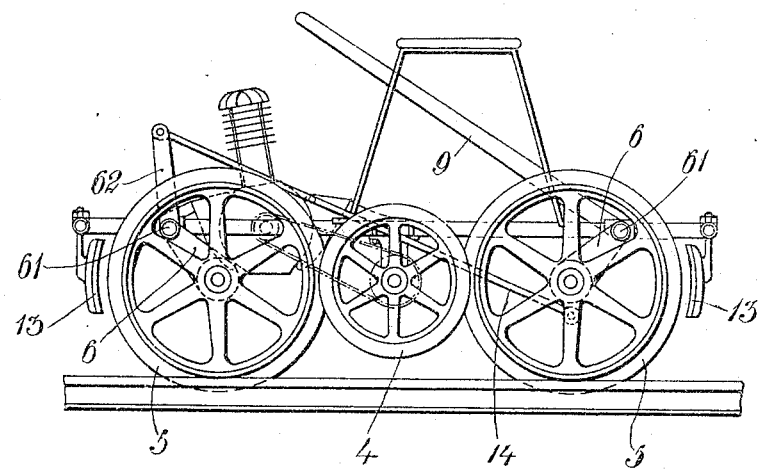

HELGE SUNDBERG, OF LJUSNE, SWEDEN.

MOTOR-TROLLEY AND SIMILAR VEHICLE.

1,210,115.   Specification of Letters Patent.   Patented Dec. 26, 1916.

Application filed April 19, 1916. Serial No. 92,260.

*To all whom it may concern:*

Be it known that I, HELGE SUNDBERG, a citizen of the Kingdom of Sweden, residing at Ljusne, Sweden, have invented new and useful Improvements in Motor-Trolleys and Similar Vehicles, of which the following is a specification.

This invention relates to improvements in motor trolleys and similar vehicles and has for its object to provide a power transmitting device for such vehicles in which the transmission of power from the motor to the traction wheels of the vehicle may be interrupted and again established in a simple way.

Another object of the invention is to provide a power transmitting device of said character in which the maximal power transmitted will be automatically adjusted according to the load of the vehicle.

The invention consists, essentially in the combination with a motor trolley, of a frame, driving wheels journaled in said frame, and traction wheels journaled in the frame in such manner that they may be moved in and out of engagement with said driving wheels.

In the accompanying drawings I have shown two embodiments of my invention.

Figure 1 shows a side elevation of a motor trolley according to one embodiment of the invention. Fig. 2 shows a plan view of the trolley with the seat removed. Fig. 3 shows a side elevation of a motor trolley according to another embodiment of the invention.

In the constructional form shown in Figs. 1 and 2 a driving shaft 1 journaled in the frame of the trolley is driven by means of a chain 2 from the motor 3. Said shaft carries two driving wheels 4 situated one on each side of the trolley between the traction wheels 5 the arrangement being such that the wheels 4 cannot touch the rails upon which the wheels 5 rest. The wheels 4 are, preferably, provided with a circumferential groove which may be engaged by the flanges of the wheels 5. The shafts of the traction wheels 5 are carried by arms 6 journaled in the frame 7 of the trolley on pins 61 in such manner that they are capable of swinging in vertical planes parallel to the longitudinal direction of the trolley. The arms 6 are so positioned that their center lines form an angle with each other the apex of which lies below the axis of the wheels 4. The weight of the trolley together with its load, accordingly, tend to press the wheels 5 in contact with the driving wheels 4. Preferably the position of the journals for the pins 61 is such that the arms 6 form an angle of 45° with the horizontal line when the traction wheels 5 bear against the driving wheels 4. The pressure of the traction wheels 5 against the wheels 4 will then be equal to the pressure of the wheels 5 against the rails. To the free end of each arm 6 is attached a wire cable 8 or the like which cables pass over suitable pulleys 81 and are attached to a hand lever 9. The cables individual to the rear pair of wheels 5 are attached to said lever at a point 91 above the pin 10 of the lever, while the cables individual to the front pair of wheels 5 are attached to the lever at a point 92 below said pin. Thus, by turning the hand lever 9 in one direction toward the seat 11 the cables will be stretched and the wheels 5 be removed from the driving wheels 4. The lever 9 may be locked by means of the latch lever 93 engaging the notched locking quadrant 12. Brake shoes 13 are attached to the ends of the frame in such a manner that the wheels 5 will be brought into contact with said brake shoes when removed from the driving wheels.

By the arrangement above described the driving power is transmitted equally to all of the traction wheels and the pressure between the traction wheels and the driving wheels will increase according as the load of the trolley increases, whereby slipping between the driving and the traction wheels is prevented. The transmission of driving power to the traction wheels may be quickly interrupted by turning the hand lever 9. At the same time a braking of the traction wheels will be effected by the wheels 5 contacting with the brake shoes 13.

The constructional form shown in Fig. 3 differs from the embodiment shown in Figs. 1 and 2 essentially in that the cables 8 are replaced by links 14, connecting the arms 6 carrying the rear pair of wheels 5 to extensions 62 of the arms 6 carrying the front pair of wheels 5 in such a manner that the two pairs of wheels 5 will be moved simultaneously toward or from the driving wheels when the arms 6 of either of such pairs of wheels 5 are operated. The arms 6 individual to one pair of traction wheels have a common shaft 61 the hand lever 9 being attached to either of the shafts 61 at will. Thus, by turning the hand lever 9 the carrying arms 6 attached to the same shaft 61 as the lever will be operated directly while the carrying arms 6 attached to the other shaft 61 will be operated by means of the links 14.

Having now described my invention, what I claim as new and desire to secure by Letters Patent is:

1. The combination with a motor trolley, of a frame, driving wheels journaled in said frame, traction wheels adapted to be pressed against the driving wheels by the weight of the trolley frame and its load, and manually operated means for moving the traction wheels out of engagement with the driving wheels.

2. The combination with a motor trolley of a frame, driving wheels journaled in said frame, traction wheels journaled in arms that are capable of swinging, and adapted to be pressed against the driving wheels by the weight of the trolley frame and its load, and manually operated means for moving the traction wheels out of engagement with the driving wheels.

3. The combination with a motor trolley of a frame, brake shoes carried thereby, driving wheels journaled in said frame, traction wheels adapted to be pressed against the driving wheels by the weight of the trolley frame and its load, and manually operated means for moving the traction wheels out of engagement with the driving wheels and into engagement with the brake shoes.

4. The combination with a motor trolley of a frame, brake shoes carried thereby, driving wheels journaled in said frame, traction wheels journaled in arms capable of swinging, and adapted to be pressed against the driving wheels by the weight of the frame and its load, and manually operated means for moving the traction wheels out of engagement with the driving wheels and into engagement with the brake shoes.

In testimony whereof I have signed my name.

HELGE SUNDBERG.

Copies of this patent may be obtained for five cents each, by addressing the "Commissioner of Patents, Washington, D. C."